(12) United States Patent
McCoy et al.

(10) Patent No.: US 6,491,839 B1
(45) Date of Patent: Dec. 10, 2002

(54) PROCESS FOR MAKING A TEXTILE FINISH COMPOSITION HAVING ANTI-SLING PROPERTIES

(75) Inventors: Kay M. McCoy, Fort Mill, SC (US); AlexSandra C. Nasser, Fort Mill, SC (US); Isaac Fleming, Charlotte, NC (US); Danny Lindsey, Monroe, NC (US)

(73) Assignee: Cognis Corporation, Cincinnati, OH (US)

( * ) Notice: Subject to any disclaimer, the term of this patent is extended or adjusted under 35 U.S.C. 154(b) by 0 days.

(21) Appl. No.: 09/551,074

(22) Filed: Apr. 18, 2000

Related U.S. Application Data

(60) Provisional application No. 60/133,223, filed on May 7, 1999.

(51) Int. Cl.$^7$ .............................................. D06M 15/19
(52) U.S. Cl. .................... 252/8.81; 252/8.84; 252/8.86; 524/313; 524/322; 524/475
(58) Field of Search ............................. 252/8.81, 8.84, 252/8.86; 524/313, 322, 475

(56) References Cited

U.S. PATENT DOCUMENTS

| | | | |
|---|---|---|---|
| 3,358,749 A | 12/1967 | Chisholm et al. | 165/141 |
| 3,404,869 A | 10/1968 | Harder | 366/338 |
| 3,583,678 A | 6/1971 | Harder | 366/340 |
| 3,652,061 A | 3/1972 | Chisholm | 366/337 |
| 4,852,991 A | 8/1989 | Frauenknecht et al. | 8/586 |
| 5,490,943 A | 2/1996 | Eicken et al. | 252/8.81 |
| 5,830,240 A | 11/1998 | Lin et al. | 8/478 |
| 5,972,039 A * | 10/1999 | Honeycutt et al. | 8/115.52 |
| 6,054,022 A | 4/2000 | Helwig et al. | 162/156 |

* cited by examiner

Primary Examiner—Anthony J. Green
(74) Attorney, Agent, or Firm—John E. Drach; Steven J. Trzaska

(57) ABSTRACT

A process for making a fiber finish composition having anti-sling properties involving: (a) providing a lubricant component; (b) providing water; (c) providing a powder-form polyethylene oxide having a weight average molecular weight of more than $10^6$; (d) providing a static in-line mixing apparatus; and (e) mixing (a)–(c) in the static in-line mixing apparatus to form the fiber finish composition.

13 Claims, 1 Drawing Sheet

PROCESS FOR MAKING A TEXTILE FINISH COMPOSITION HAVING ANTI-SLING PROPERTIES

CROSS-REFERENCE TO RELATED APPLICATIONS

This application claims the benefit of copending provisional application serial No. 60/133,223, filed on May 7, 1999.

STATEMENT REGARDING FEDERALLY SPONSORED RESEARCH OR DEVELOPMENT

Not Applicable.

BACKGROUND OF THE INVENTION

In the manufacture of synthetic fibers spun from the melt, the first processing step immediately after the capillaries emerge from the spinning jet, i.e., immediately after formation of the filaments, is the treatment of the fiber surface with spinning finishes containing lubricants and antistatic agents as their principal active substances. It is generally known that synthetic fibers can neither be produced nor used in textile fiber processing without such finishes. A lubricant has to be applied because the original surface of most polymeric fibers gives rise to considerable friction forces so that chafing of the fibers occurs through the constant contacts, for example with guide elements, during the production and processing cycles and can ultimately result in filament or yarn breakages. In addition, polymeric filament materials generally absorb only a little water so that they tend to develop electrostatic charges.

For general commercial acceptability, it is important that fiber finishes for synthetic fibers reduce friction between the yarn and contact surfaces, for example, surfaces of processing machinery or interfaces with other fibers; adhere to the yarn to reduce sling-off during processing; and be scourable to permit substantially complete removal before downstream operations such as dyeing and finishing, with which lubricant residue would substantially interfere. It is particularly important that lubricant compositions consistently function well to perform these tasks under a variety of operating conditions, in order to obviate the necessity of re-evaluating and reformulating each finish/lubricant composition on an ad hoc basis.

Anti-sling additives for fiber lubricants and finishes, especially coning oil type lubricants, are well-known in the art as protective coatings for fibers in a variety of textile operations. Many of these additives, particularly relatively low molecular weight polymers such as polyisobutylene, are in common use to improve adherence of the finish to the fibers, and reduce finish "sling-off" during yarn winding operations.

While these types of additives have proven to be generally useful in lubricants for low-to-medium speed fiber winding operations, i.e., yarn speeds of up to about 300 meters/minute, in ultra high speed winding operations, conventional low molecular weight polyisobutylene and comparable low-sling polymer additives have not sufficed to reduce lubricant sling-off/spraying to acceptable levels. Moreover, these known additives are not uniformly reliable and tend to perform erractically under varying process parameters, particularly with respect to fiber type, yarn speed, machinery characteristics, processing temperatures, and recirculation conditions. In addition, spraying of the finish also results in a reduction in safety, for example, slippery floors in the immediate vicinity of the machines and also breathing difficulties and skin irritation produced by sprayed droplets which are dispersed in the form of a fine mist.

While the use of polyethylene oxides having weight average molecular weights of more than $10^6$ have been found to be useful as anti-sling additives in spin finishes, they are typically incorporated into fiber finishes in the form of an aqueous suspension, i.e., a suspension of polymer powder in water is mixed with a fiber finish. Although the incorporation of an anti-sling additive in the form of an aqueous suspension is generally acceptable, it does pose certain problems with respect to packaging and formulation. The packaging required when distributing an aqueous suspension is significantly larger and more involved due to the presence of water in a packaging container. Moreover, as to the formulation of an end-use finish composition, the formulator must take the water into account when mixing the aqueous anti-sling additive suspension with the components comprising the finish composition.

Therefore, it is an object of the present invention to devise a way in which the polymer acting as an anti-sling additive can be incorporated into a fiber finish composition, in powder form, thereby eliminating the need of using it as an aqueous suspension.

BRIEF SUMMARY OF THE INVENTION

The present invention is directed to a process for making a fiber finish composition having anti-sling properties involving:

(a) providing a lubricant component;

(b) providing a water component;

(c) providing a powder-form polyethylene oxide having a weight average molecular weight of more than $10^6$; and (d) mixing (a)–(c) in a static in-line mixing apparatus.

BRIEF DESCRIPTION OF THE SEVERAL VIEWS OF THE DRAWING

The following drawing is illustrative of an embodiment of an apparatus which may be employed in the invention and is not intended to limit the invention as encompassed by the claims forming part of the application.

The sole FIGURE is a schematic view of one embodiment of an apparatus which may be employed in the invention for the in-line formulation of textile finish compositions in which multiple raw textile finish components and water are introduced into an interfacial surface generator, through multiple inlet ports, where they are subsequently statically mixed and discharged as a newly formulated textile finish composition through the outlet conduit.

DETAILED DESCRIPTION OF THE INVENTION

Figure 1:
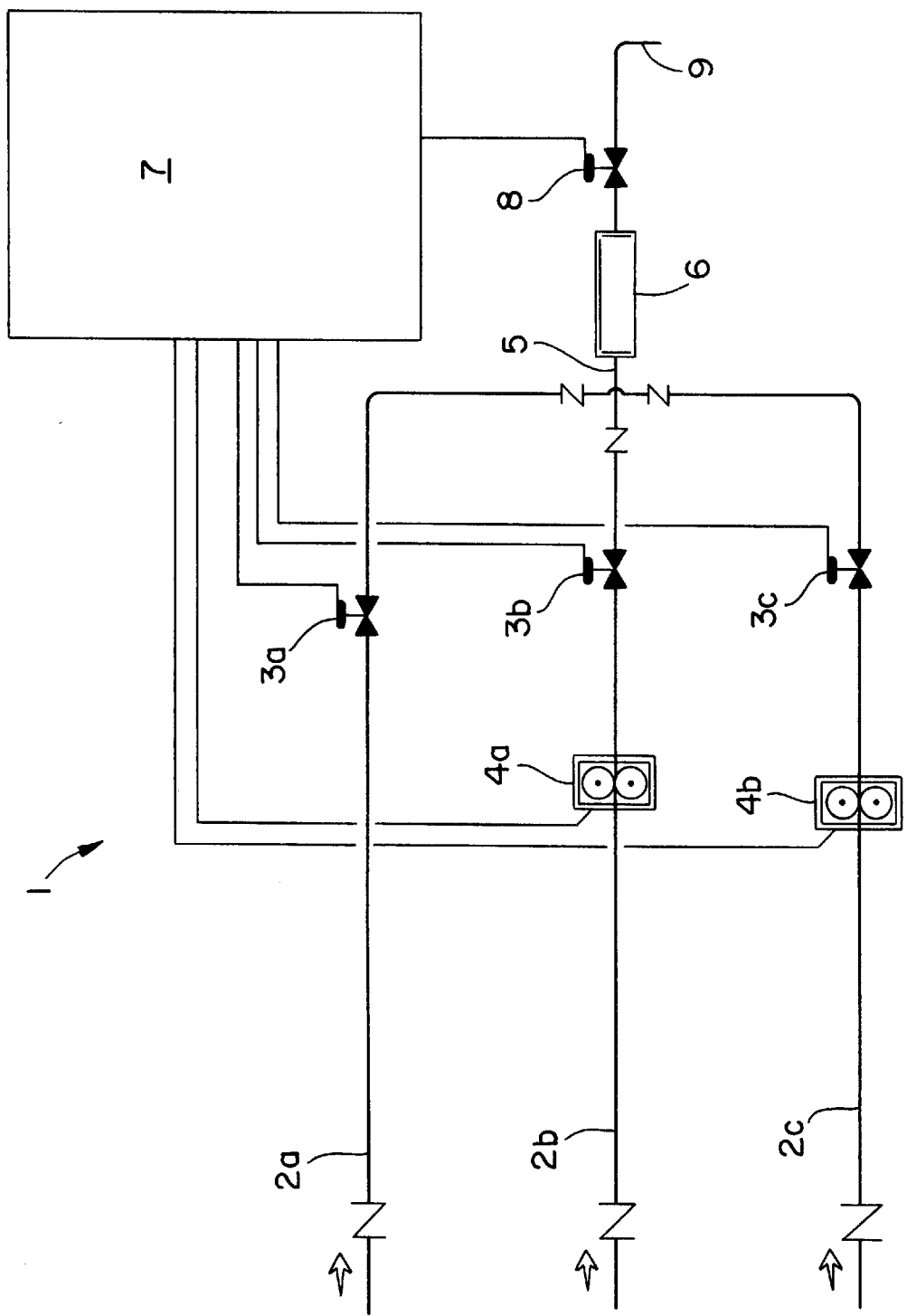

Other than in the operating examples, or where otherwise indicated, all numbers expressing quantities of ingredients or reaction conditions are understood as being modified in all instances by the term "about".

The present invention is based upon the surprising discovery that a powder-form anti-sling additive such as polyethylene oxide having a weight average molecular weight of more than $10^6$ can be directly incorporated into a fiber finish composition, thus eliminating the need for having to use an anti-sling additive in the form of an aqueous suspension, prior to incorporating it into a fiber finish composition.

Suitable lubricant components for use in the process of the present invention include, but are not limited to, mineral oils, carboxylic acid esters prepared from aliphatic $C_{8-22}$ carboxylic acids and linear and/or branched, optionally alkoxylated $C_{1-22}$ alkyl alcohols such as, for example, isobutyl stearate, n-hexyl laurate, tallow fatty acid 2-ethylhexyl ester, coconut oil fatty acid triglycerides and/or trimethylol propane tripelargonate; silicones such as, for example, dimethyl polysiloxane; and/or polyalkylene glycols such as, for example, ethylene oxidepropylene oxide copolymers having average molecular weights of from 600 to 6,000.

Suitable powder-form polyethylene oxides having a weight average molecular weight of more than $10^6$ are well known in the art. Examples thereof are marketed by Union Carbide under the tradenames POLYOX® WSR301 and POLYOX® WSR coagulant.

According to the process of the present invention, a lubricant component, water and a powder-form polyethylene oxide are formulated into a fiber finish composition using a static in-line mixing apparatus.

Water along with the lubricant and powder-form ethylene oxide is fed into a static in-line mixing apparatus comprising an interfacial surface generator wherein the components are intimately mixed in order to produce a formulated fiber finish composition of predetermined quantity, concentration and characteristics prior to contact with a textile substrate. The precise amount of each component used in formulating the fiber finish composition, along with any auxiliary/additional components which may be included, will depend upon the particular treatment being applied onto the fibers being processed, and thus can easily be determined by a formulator skilled in the art of fiber finish formulation.

Referring to the sole drawing, the principal components of the mixing apparatus 1 employed to carry out the present invention include a water inlet port 2a and raw textile finish component inlet ports 2b and 2c for introducing water, lubricant and powder-form polyethylene oxide, an interfacial surface generator 6 for statically mixing the water, lubricant and powder-form polyethylene oxide, an outlet port 9 for dispensing the formulated fiber finish composition and a control unit 7 for controlling the operation of the apparatus 1.

In operation, water is introduced into the apparatus from a source, not shown, through inlet port 2a. Lubricant and polyethylene oxide are similarly introduced from individual sources, not shown, through inlet ports 2b and 2c. Valves 3a, 3b and 3c, are used to open and close inlet ports 2a, 2b and 2c so that water and the various fiber finish components may be introduced into the interfacial surface generator 6 through fluid port 5. Pumps 4a and 4b are used to meter the raw fiber finish components through inlet ports 2b and 2c where they are combined, along with the water, into a single fluid stream and fed through fluid port 5 into the interfacial surface generator 6.

The interfacial surface generator 6 employed in the present invention is well known in the art. For example, U.S. Pat. No. 3,583,678, hereby incorporated by reference, discloses a typical interfacial surface generator used for static mixing of fluids wherein a fluid stream is divided into a plurality of substreams which are then recombined, divided, repositioned, and recombined again until a desired degree of mixing is obtained. These types of interfacial surface generators are capable of providing a degree of mixing that is a function of the number of static mixing elements (n) employed. Each element individually divides and mixes the liquid stream four times. Consequently, each additional element (n) employed increases the degree of mixing on the order of $4^n$. Other examples of interfacial surface generators known in the art, and also incorporated herein by reference, are disclosed in U.S. Pat. No. 3,358,749, 3,404,869 and 3,652,061.

Once the water, lubricant and powder-form polyethylene oxide are sufficiently mixed, valve 8 is opened so that the textile finish composition may be discharged through outlet port 9. The freshly formulated fiber finish composition is then ready for application onto a textile substrate.

It should be noted, however, that while the process of the present invention envisions the use of a static in-line mixing apparatus similar to the one described above, any other suitable type of static in-line mixing apparatus may also be employed, without departing from the spirit of the invention.

Auxiliary fiber finish component(s) may also be incorporated into the fiber finish composition, if desired, to help further enhance the effectiveness of the composition. Suitable auxiliary/additive components include, but are not limited to, emulsifiers, anti-static agents, wetting agents, and the like.

Anti-static agents function by either reducing the charge generation or by increasing the rate of charge dissipation. Most antistats operate by increasing the rate of dissipation and rely on atmospheric moisture for their effectiveness. A hydrophobic fiber such as polypropylene depends on an antistat coating to impart high surface conductivity for charge dissipation.

The antistatic agent may comprise any suitable anionic, cationic, amphoteric or nonionic antistatic agent. Anionic antistatic agents are generally sulfates or phosphates such as the phosphate esters of alcohols or ethoxylated alcohols. Cationic antistatic agents are typified by the quaternary ammonium compounds and imidazolines which possess a positive charge. Examples of nonionics include the polyoxyalkylene derivatives. The anionic and cationic materials tend to be more effective antistats. Preferred anionic antistatic agents for use herein include an alkali metal salt, e.g., potassium, of a phosphate ester such as commercially available from Henkel Corporation, Mauldin, S.C., under the tradenames TRYFAC® 5559 or TRYFAC® 5576. Preferred nonionic antistatic agents include ethoxylated fatty acids (EMEREST® 2650, an ethoxylated fatty acid), ethoxylated fatty alcohols (TRYCOL® 5964, an ethoxylated lauryl alcohol), ethoxylated fatty amines (TRYMEEN® 6606, an ethoxylated tallow amine), and alkanolamides (EMID® 6545, an oleic diethanolamine). Such products are commercially available from Henkel Corporation, Mauldin, S.C.

The satisfactory application of a fiber finish composition oftentimes requires that a surfactant and/or a solvent be used as a wetting agent in the composition. The surfactant and/or solvent acts to ensure that the particular textile finish composition to which it is added is evenly and effectively distributed throughout the textile substrate. While the use of wetting agents in textile finish compositions is well known in the art, a particularly preferred wetting agent is an alkylpolyglycoside of formula I $$R^1O(Z)_a \qquad (I)$$

wherein $R^1$ is a monovalent organic radical having from about 6 to about 30 carbon atoms; Z is a saccharide residue having 5 or 6 carbon atoms; and a is a number having a value from 1 to about 6.

By employing the process of the present invention, the need for using both an emulsifier and a preservative are eliminated since the finish compositions can be formulated quickly, on an as-needed basis.

What is claimed is:

1. A process for making a fiber finish composition having anti-sling properties comprising:
   (a) providing a lubricant component;
   (b) providing water;
   (c) providing a powder-form polyethylene oxide having a weight average molecular weight of more than $10^6$;
   (d) providing a static in-line mixing apparatus; and
   (e) mixing (a)–(c) in the static in-line mixing apparatus to form the fiber finish composition.

2. The process of claim 1 further comprising introducing an antistatic agent into the static in-line mixing apparatus, along with (a)–(c) to form a fiber finish composition having antistatic properties.

3. The process of claim 1 further comprising introducing a surfactant into the static in-line mixing apparatus, along with (a)–(c) to form a fiber finish composition having improved wetting properties.

4. The process of claim 3 wherein the surfactant is an alkyl polyglycoside corresponding to formula I:

$$R^1O(Z)_a \qquad (I)$$

wherein $R^1$ is a monovalent organic radical having from about 6 to about 30 carbon atoms, Z is a saccharide residue having 5 or 6 carbon atoms, and a is a number having a value of from 1 to about 6.

5. A fiber finish composition comprising:
   (a) a lubricant component;
   (b) water; and
   (c) a polyethylene oxide having a weight average molecular weight of more than $10^6$, wherein the fiber finish composition is free of an emulsifier.

6. The composition of claim 5 wherein the composition is free of a preservative.

7. The composition of claim 5 further comprising an antistatic agent.

8. The composition of claim 5 further comprising a surfactant.

9. The composition of claim 8 wherein the surfactant is an alkyl polyglycoside corresponding to formula I:

$$R^1O(Z)_a \qquad (I)$$

wherein $R^1$ is a monovalent organic radical having from about 6 to about 30 carbon atoms, Z is a saccharide residue having 5 or 6 carbon atoms, and a is a number having a value of from 1 to about 6.

10. The product of the process of claim 1 and wherein said product is free of an emulsifier.

11. The product of the process of claim 2 and wherein said product is free of an emulsifier.

12. The product of the process of claim 3 and wherein said product is free of an emulsifier.

13. The product of the process of claim 4.

* * * * *